US012749946B2

(12) United States Patent
Krank et al.

(10) Patent No.: US 12,749,946 B2
(45) Date of Patent: Sep. 29, 2026

(54) STATOR ARRANGEMENT AND ELECTRIC MACHINE FOR A MOTOR VEHICLE

(71) Applicant: Bayerische Motoren Werke Aktiengesellschaft, Munich (DE)

(72) Inventors: Benjamin Krank, Munich (DE); Christian Puzzo, Moensheim (DE); Jens Richter, Neubiberg (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 147 days.

(21) Appl. No.: 18/282,581

(22) PCT Filed: Apr. 21, 2022

(86) PCT No.: PCT/EP2022/060477
§ 371 (c)(1),
(2) Date: Sep. 18, 2023

(87) PCT Pub. No.: WO2022/238088
PCT Pub. Date: Nov. 17, 2022

(65) Prior Publication Data
US 2024/0162785 A1 May 16, 2024

(30) Foreign Application Priority Data
May 11, 2021 (DE) ..................... 10 2021 112 194.9

(51) Int. Cl.
*H02K 9/19* (2006.01)

(52) U.S. Cl.
CPC ..................................... *H02K 9/19* (2013.01)

(58) Field of Classification Search
CPC ................................ H02K 7/003; H02K 9/19
See application file for complete search history.

(56) References Cited

U.S. PATENT DOCUMENTS

2015/0303759 A1 10/2015 Nishikawa
2017/0047806 A1* 2/2017 Hwang .................. H02K 5/207
(Continued)

FOREIGN PATENT DOCUMENTS

CN B15106849434 A 6/2017
CN 107437859 A 12/2017
(Continued)

OTHER PUBLICATIONS

International Search Report (PCT/ISA/210) issued in PCT Application No. PCT/EP2022/060477 dated Sep. 2, 2022 with English translation (4 pages).
(Continued)

*Primary Examiner* — Christopher M Koehler
*Assistant Examiner* — Ethan Nguyen Vo
(74) *Attorney, Agent, or Firm* — Crowell & Moring LLP

(57) ABSTRACT

A stator arrangement of a stator of an electric machine, includes a cooling-fluid conducting element on the stator, wherein the cooling-fluid conducting element is arranged on an end face of the stator, and protrudes at least regionally from the end face of the stator in the axial direction of the stator, with the result that, by the cooling-fluid conducting element, cooling fluid flowing along the end face of the stator can be collected, and has at least one deflection region which is designed to deflect the collected cooling fluid to a stator connection device of the stator, with the result that, for cooling the stator connection device, the cooling fluid can flow around the stator connection device.

10 Claims, 2 Drawing Sheets

(56) References Cited

U.S. PATENT DOCUMENTS

| | | | | |
|---|---|---|---|---|
| 2017/0346371 | A1 | 11/2017 | Gruetzner et al. | |
| 2019/0296611 | A1 | 9/2019 | Kimoto et al. | |
| 2019/0305643 | A1 | 10/2019 | Huber et al. | |
| 2022/0200373 | A1* | 6/2022 | Lang | B60K 1/00 |

FOREIGN PATENT DOCUMENTS

| | | | | | |
|---|---|---|---|---|---|
| DE | 10 2016 205 653 | A | | 10/2017 | |
| DE | 10 2018 216 301 | A1 | | 3/2020 | |
| DE | 11 2017 006 138 | B4 | | 4/2021 | |
| EP | 2 242 164 | A1 | | 10/2010 | |
| JP | 2011-188686 | A | | 9/2011 | |
| JP | 2011-234590 | A | | 11/2011 | |
| JP | 2014176203 | A | * | 9/2014 | H02K 9/19 |
| JP | 2015-213266 | A | | 11/2015 | |
| JP | 2018-33197 | A | | 3/2018 | |
| WO | WO 2018/137955 | A1 | | 8/2018 | |

OTHER PUBLICATIONS

German-language Written Opinion (PCT/ISA/237) issued in PCT Application No. PCT/EP2022/060477 dated Sep. 2, 2022 with English translation (10 pages).

German-language Search Report issued in German Application No. 10 2021 112 194.9 dated Jan. 25, 2022 with partial English translation (10 pages).

English translation of Chinese-language Office Action issued in Chinese Application No. 202280019426.4 dated May 29, 2026 (8 pages).

* cited by examiner

STATOR ARRANGEMENT AND ELECTRIC MACHINE FOR A MOTOR VEHICLE

FIELD

The invention relates to a stator arrangement of a cooling fluid conducting element on a stator of an electric machine, and to an electric machine for a motor vehicle.

BACKGROUND AND SUMMARY

WO 2018/137955 A1 discloses an electric machine having a rotor, which is arranged on a rotor shaft for conjoint rotation, and a stator. An axial coolant supply line and at least one radial coolant supply line, which is connected to the axial coolant supply line so as to conduct coolant, are arranged in the rotor shaft. An interior of the electric machine is connected to the radial coolant supply line so as to conduct coolant. When the rotor rotates, coolant is transferred from the rotor to the stator. This can take place portion by portion, in particular by coolant spraying from the rotor onto the stator. The coolant can then absorb heat from the stator.

It is an object of the present invention to provide a solution which permits particularly good cooling of a stator connection device of a stator of an electric machine.

This object is achieved according to the invention by the subject matter of the present disclosure. Further possible refinements of the invention are also disclosed in the description and the figures.

The invention relates to a stator arrangement of a cooling fluid conducting element on a stator of an electric machine. The electric machine can be designed in particular to drive a motor vehicle with electrical energy. In the case of the stator arrangement, the cooling fluid conducting element is arranged on an end face of the stator and protrudes at least in certain regions from the end face of the stator in the axial direction of the stator. In other words, the cooling fluid conducting element protrudes over the end face of the stator in a direction of extent of a central axis of the stator. Cooling fluid flowing along the end face of the stator can be trapped by means of the cooling fluid conducting element. The cooling fluid conducting element is therefore designed to trap cooling fluid flowing along the end face of the stator, in particular by the cooling fluid conducting element outwardly delimiting an overflow face of the end face of the rotor, over which the cooling fluid can flow, in the radial direction of the stator. The cooling fluid conducting element has at least one deflection region which is designed to deflect the trapped cooling fluid to a stator connection device of the stator, as a result of which the cooling fluid can flow around the stator connection device in order to cool the stator connection device.

In other words, the cooling fluid conducting element diverts the cooling fluid flowing along the end face of the stator to the stator connection device of the stator. The effect achieved by this is targeted flow of the cooling fluid against the stator connection device, as a result of which the stator connection device can be cooled by means of the cooling fluid. The cooling fluid conducting element therefore permits targeted cooling of the stator connection device by means of the cooling fluid guided in the circuit in the electric machine. This cooling fluid can therefore be designed to cool a laminated stator core of the stator as it flows over the end face, and also to cool the stator connection device. Furthermore, the cooling fluid can be designed to cool a rotor and/or a rotor shaft of the electric machine. The stator connection device can in particular comprise connection wires for respective stator windings which can be cooled by the cooling fluid flowing around them. The cooling of the stator connection device permits particularly efficient operation of the electric machine since overheating of the stator arrangement, in particular of the stator connection device, can be at least substantially avoided. In particular in the case of electric machines of a high power class, the cooling of the stator connection device makes it possible to describe the electric machine to be particularly dynamic, for example when the motor vehicle having the electric machine is traveling uphill and downhill.

In a further refinement of the invention, provision is made that the cooling fluid conducting element is designed as an annular segment or as a circumferentially closed annular element. The configuration of the cooling fluid conducting element as an annular element or at least as an annular segment permits a particularly good radially outward delimitation of the overflow surface of the end face of the stator and therefore particularly reliable trapping of cooling fluid flowing along the end face of the stator. The configuration of the cooling fluid conducting element as an annular segment makes it possible for the cooling fluid conducting element to be particularly low in weight and particularly space-saving. When the annular element is circumferentially closed, it can be ensured that a particularly large amount of cooling fluid flowing along the end face of the stator is trapped by means of the cooling fluid conducting element and deflected onto the stator connection device. It can be at least substantially avoided that the cooling fluid flows radially outwardly past the circumferentially closed annular element. This makes it possible to avoid cooling power of the cooling fluid not being used for cooling the stator connection device.

Provision is made, in a further refinement of the invention, that the cooling fluid conducting element extends at least over a circumferential segment of the stator, in which the stator connection device is arranged. In particular when the cooling fluid conducting element is configured as an annular segment which is particularly low in weight and takes up little construction space, provision is made that the cooling fluid conducting element extends at least over the circumferential segment of the stator, in which the stator connection device is arranged. By this means, the deflection of the cooling fluid onto the stator connection device by means of the cooling fluid conducting element can be ensured, with, after deflection of the cooling fluid, the cooling fluid only having to cover a particularly short path to reach the stator connection device.

In a further refinement of the invention, provision is made that the cooling fluid conducting element lies on a laminated stator core of the stator. This means that cooling fluid flowing along the laminated stator core of the stator can be trapped by means of the cooling fluid conducting element and deflected onto the stator connection device. In particular, the cooling fluid conducting element rests on an end face of the laminated stator core of the stator. In this case, the cooling fluid conducting element can be fastened to the laminated stator core of the stator. Placing of the cooling fluid conducting element onto the laminated stator core of the stator makes it possible to at least substantially avoid the cooling fluid flowing radially past the cooling fluid conducting element between the cooling fluid conducting element and the laminated stator core.

In this connection, provision can be made, in a development of the invention, for the cooling fluid conducting element to radially outwardly cover regions of stator windings protruding from the laminated stator core. By this means, cooling fluid flowing between those regions of the stator windings which protrude from the laminated stator core can be trapped radially by means of the cooling fluid conducting element. Cooling fluid flowing radially through between the stator windings protruding over the laminated stator core can therefore be deflected onto the stator connection device of the stator by means of the cooling fluid conducting element. By this means, both the laminated stator core and those regions of the stator windings which protrude from the laminated stator core and also the stator connection device can be cooled by means of the cooling fluid.

Provision is made, in a further refinement of the invention, that the cooling fluid conducting element has at least one clamping element which, for holding the cooling fluid conducting element on the stator, forms a clamping connection to stator windings of the stator. The clamping element can therefore enter into a force-fitting and/or form-fitting connection with the stator windings of the stator, as a result of which the cooling fluid conducting element can be held particularly securely on the end face of the stator. This at least one clamping element can in particular be inserted between at least two stator windings of the stator and interlocked therewith. The cooling fluid conducting element can therefore be held particularly securely and simply on the stator of the electric machine via the clamping element.

In a further refinement of the invention, provision is made that the cooling fluid conducting element has at least one guide vane which protrudes radially from the deflection region toward a central axis of the stator and has a deflection element arranged at its free end. In this case, the deflection element is designed to trap cooling fluid flowing over the end face of the stator in the circumferential direction of the stator and to deflect it toward the deflection region. In particular in the case of a configuration of the cooling fluid conducting element as an annular segment, the at least one guide vane permits trapping of a particularly large amount of cooling fluid flowing along the end face of the stator by means of the cooling fluid conducting element. The at least one guide vane of the cooling fluid conducting element therefore makes it possible not only for the cooling fluid conducting element to be able to be used to trap cooling fluid flowing over the end face of the stator radially away from a central axis of the stator, but also to be able to use the cooling fluid conducting element to trap cooling fluid flowing over the end face of the stator in the circumferential direction of the stator and to be able to divert it toward the stator connection device. By this means, a particularly large amount of cooling fluid flowing along the end face of the stator can be deflected onto the stator connection device, as a result of which the stator connection device can be particularly readily cooled.

The invention furthermore relates to an electric machine for a motor vehicle, which is designed in particular to drive the motor vehicle with electrical energy. This electric machine comprises a rotor, which is held on a rotor shaft for conjoint rotation, and a stator arrangement, as has already been described in conjunction with the stator arrangement according to the invention. Owing to the targeted cooling of the stator connection device by means of the diverted cooling fluid, the electric machine can have a particularly high power class. Advantages and advantageous developments of the stator arrangement according to the invention should be regarded as advantages and advantageous developments of the electric machine, and vice versa.

In a development of the invention, provision is made that the rotor shaft has a cavity through which the cooling fluid flows, and at least one radial opening via which the cooling fluid can flow radially out of the rotor shaft. By this means, the cooling fluid which has flowed out of the rotor shaft can flow along a further end face of the rotor to the end face of the stator. In the case of the electric machine, provision is therefore made that the cooling fluid flows through the cavity of the rotor shaft and can subsequently emerge from the rotor shaft via the at least one radial opening. The cooling fluid emerging from the rotor shaft via the at least one radial opening subsequently flows along the rotor end face, which is assigned to the at least one radial opening, in the direction of the end face of the stator and subsequently flows along the end face of the stator. Therefore, the rotor shaft and the rotor and also the stator of the electric machine can be cooled by means of the cooling fluid. The electric machine is therefore wet-cooled. After the cooling fluid has flowed along the end face of the stator, at least some of the cooling fluid flowing along the end face of the stator can be deflected to the stator connection device by means of the cooling fluid conducting element. The electric machine can therefore be cooled particularly extensively by means of the cooling fluid guided in particular in a circuit, as a result of which the electric machine can be operated particularly efficiently.

In a further refinement of the invention, provision is made that those regions of the stator windings which protrude from the laminated stator core radially outwardly surround the further end face of the rotor and are designed to guide the cooling fluid from the further end face of the rotor to the end face of the stator. In particular, regions of the stator windings that protrude from the laminated stator core can be bent over, as a result of which the bent-over regions of the stator windings at least substantially impermeably surround the further end face of the rotor radially outward for the cooling fluid. This makes it possible to ensure that cooling fluid flowing radially outward from the further end face of the rotor is guided from the bent-over regions of the stator windings to the end face of the stator, along which the cooling fluid can subsequently flow. In a region of the stator windings, in which the stator windings emerge from the laminated stator core and which is different from the region in which the stator windings are bent over, the cooling fluid can flow outward radially between respective stator windings of the stator as it flows along the end face of the stator. The cooling fluid flowing along the end face of the stator between the stator windings can be trapped by the cooling fluid conducting element radially surrounding those regions of the stator windings which protrude from the laminated stator core and can be deflected to the stator connection device. The bent-over regions of the stator windings can therefore be used to guide the cooling fluid particularly simply from the further end face of the rotor to the end face of the stator in order to permit cooling of the stator connection device.

Further features of the invention can arise from the claims, the figures and the description of the figures. The features and combinations of features mentioned above in the description and the features and combinations of features shown below in the description of the figures and/or in the figures alone can be used not only in the respectively stated combination, but also in different combinations or by themselves without departing from the scope of the invention.

DETAILED DESCRIPTION

In the figures, identical and functionally identical elements are provided with the same reference signs.

Figure 1:
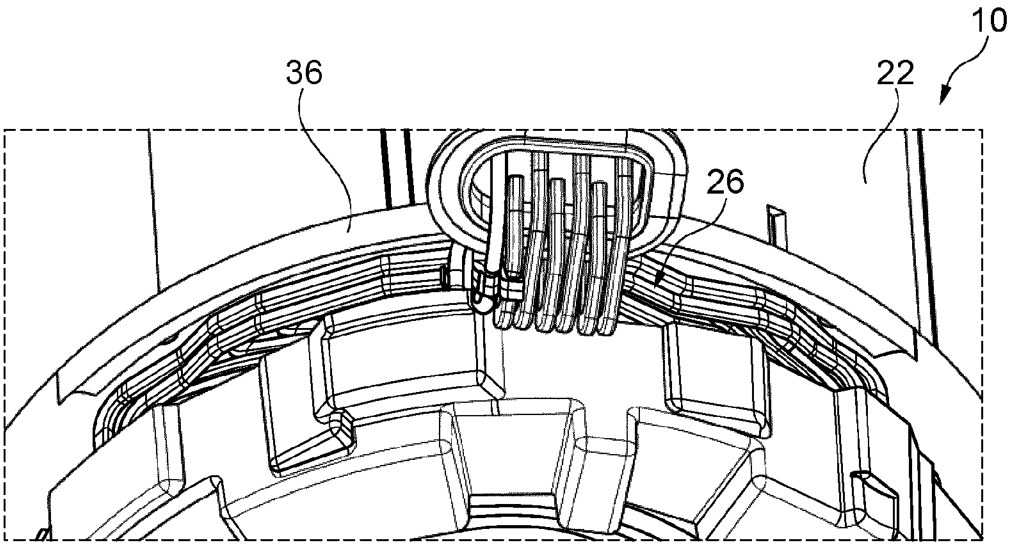
FIG. 1 shows a schematic perspective view of a stator arrangement of an electric machine, with a cooling fluid conducting element which is arranged on an end face of a stator of the electric machine and is designed to deflect cooling fluid flowing along an end face of the stator onto a stator connection device of the stator, as a result of which the stator connection device can be cooled by the cooling fluid flowing around it.
Figure 4:
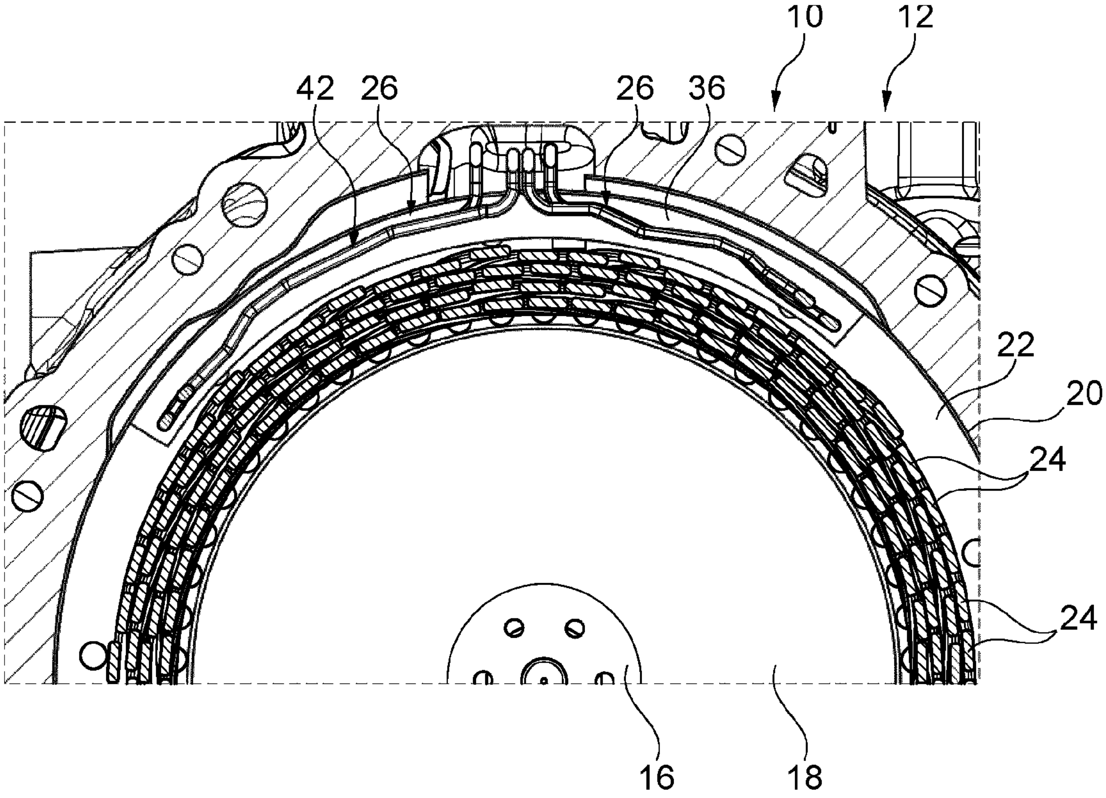
FIG. 4 shows a schematic cross-sectional view of the electric machine.

FIG. 1 shows a stator arrangement 10 of an electric machine 12. This electric machine 12 is designed in particular to drive a motor vehicle by means of electrical energy. In the present case, the electric machine 12 which is shown in sectioned form both in FIG. 2 and in FIG. 4 comprises a rotor shaft 16 on which a rotor 18 is held for conjoint rotation and which has a cavity 14. Surrounding the rotor 18 at least in certain regions on the outer circumference, the electric machine 12 comprises a stator 20. This stator 20 comprises a laminated core 22 through which a plurality of stator windings 24 are inserted. For the sake of clarity, only some of the stator windings 24 are provided with the associated reference signs. The stator windings 24 are connected to a stator connection device 26 of the stator 20. The stator connection device 26 comprises a plurality of connection wires with which the stator windings 24 of the stator 20 are electrically in contact.

Figure 2:
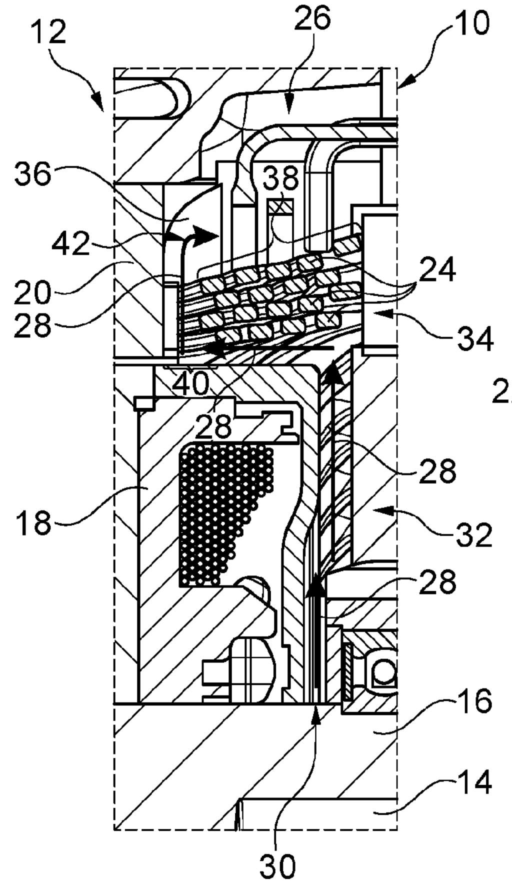
FIG. 2 shows a schematic sectional view of a detail of the electric machine, with the stator arrangement and with a rotor, which is held on a rotor shaft for conjoint rotation, wherein, during operation of the electric machine, the cooling fluid flows through a cavity of the rotor shaft, the cooling fluid flows out of the rotor shaft via at least one radial opening in the rotor shaft, the cooling fluid furthermore flows along a further end face of the rotor to the end face of the stator, and then the cooling fluid is deflected onto the stator connection device of the stator by means of the cooling fluid conducting element.

In order to permit efficient operation of the electric machine 12, provision is made that the electric machine 12 is cooled by means of a cooling fluid 28. This cooling fluid 28 can circulate in the electric machine 12 and is designed to absorb heat from the electric machine 12. In particular, the electric machine 12 can be designed to be wet-running. For particularly efficient cooling of the electric machine 12, it is provided in the present case that, as can be seen in FIG. 2, the cooling fluid 28 from the cavity 14 of the rotor shaft 16 emerges from the rotor shaft 16 via at least one radial opening 30 in the rotor shaft 16. After the cooling fluid 28 has emerged from the rotor shaft 16 via the at least one radial opening 30, the cooling fluid 28 flows radially outward along an end face 32 of the rotor 18. This rotor end face 32 can be enclosed radially outward on the circumference by the stator windings 24 of the stator 20. This makes it possible for the cooling fluid 28 flowing away radially from the end face 32 of the rotor 18 to be guided to an end face 34 of the stator 20 by means of the stator windings 24. The cooling fluid 28 can continue to flow outward in the radial direction along this end face 34 of the stator 20. By means of this cooling fluid guide of the cooling fluid 28, the rotor shaft 16, the rotor 18 and the stator 20 of the electric machine 12 can be particularly readily cooled.

Effective cooling of electric drive machines constitutes a main requirement for a dynamic driving performance of the motor vehicle driven by means of the electric machine 12. Individual current-conducting conductors, in particular of the stator connection device 26, have to be cooled in order to avoid a spatially limited excess temperature since the spatially limited excess temperature can limit a continuous power of the electric machine 12. In the present case, these critical current-conducting conductors are stator connection wires of the stator connection device 26. In particular during dynamic hill travel, hill travel with a trailer or slow hill travel, overheating of the stator connection device 26 should be avoided.

The stator connection wires of the stator connection device 26 lie freely in a machine space of the electric machine 12 and, because of an assembly sequence of the stator 20, are not cooled by solid body heat conduction. Cooling by oil or air is therefore desirable. In the case of the present stator arrangement 10 or the electric machine 12, provision is made that the stator connection device 26 is cooled with the cooling fluid 28, which can be in particular oil, since this cooling fluid 28 is already guided through the electric machine 12. The stator arrangement 10 of the electric machine 12 ensures that cooling fluid 28, in particular an oil flow, sufficiently passes to the stator connection device 26 to be cooled.

Figure 3:
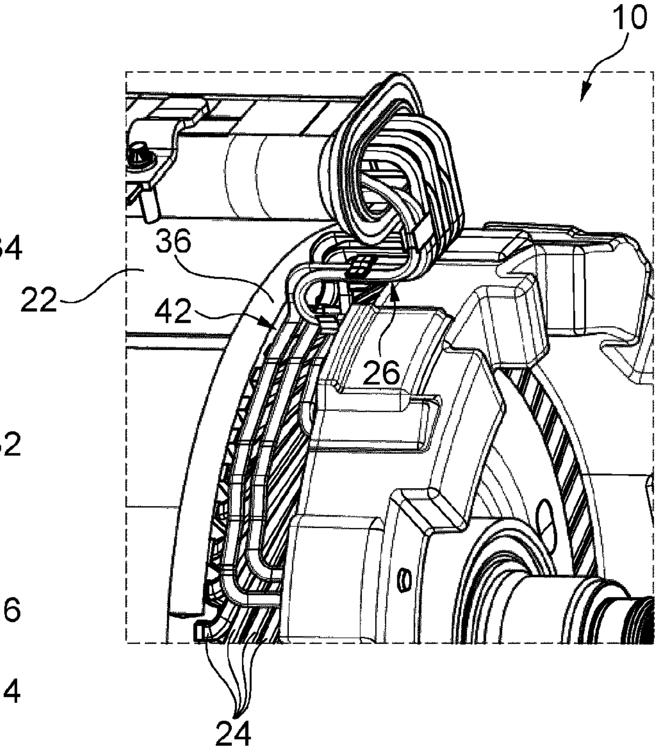
FIG. 3 shows a schematic perspective view of the electric machine in the region of the stator arrangement, wherein it can be seen that the cooling fluid conducting element protrudes in the axial direction from the end face of the stator, as a result of which cooling fluid flowing along the end face of the stator can be trapped radially by means of the cooling fluid conducting element.

In order to ensure sufficient cooling of the stator connection device 26, the stator arrangement 10 comprises a cooling fluid conducting element 36 in addition to the stator 20. As can be particularly readily seen in FIGS. 1 to 4, this cooling fluid conducting element 36 is designed in the present case as an annular segment. Alternatively, the cooling fluid conducting element 36 can be designed as a circumferentially closed annular element. As can be particularly readily seen in FIGS. 1 and 3, the cooling fluid conducting element 36 lies on the laminated core 22 of the stator 20. In this case, the cooling fluid conducting element 36 is arranged on the end face 34 of the stator 20. On the end face 34, the cooling fluid conducting element 36 protrudes in the axial direction from the laminated core 22 of the stator 20. By this means, the stator windings 24 protruding from the laminated core 22, as can be seen in FIG. 2, are covered at least in certain regions circumferentially and therefore radially outward by the cooling fluid conducting element 36. As can be seen in FIG. 2, the stator windings 24 have a bent-over bending-over region 38 in which the stator windings 24 prevent the cooling fluid 28 from flowing radially outward. Furthermore, the stator windings 24 have a protrusion region 40 which is adjacent to the bending-over region 38 and in which the stator windings 24 protrude over the laminated core 22. In the protrusion region 40, the cooling fluid 28 can flow radially outward between the respective stator windings 24. By this means, a flow of the cooling fluid 28 along the end face 34 of the stator 20, in particular along the laminated core 22, outward in the radial direction is made possible in the protrusion region 40 of the stator windings 24. This protrusion region 40 of the stator windings 24 is covered radially outward at least over a circumferential region by the cooling fluid conducting element 36. The cooling fluid 28 flowing radially outward along the end face 34 of the stator 20 in the protrusion region 40 of the stator windings 24 can therefore be trapped by means of the cooling fluid conducting element 36.

The cooling fluid conducting element 36 has a deflection region 42 which is designed to divert the collected cooling fluid 28 toward the stator connection device 26 in order to enable the cooling fluid 28 to flow around the stator connection device 26. In the deflection region 42, the cooling fluid conducting element 36 in the present case has a curvature via which the cooling fluid 28 is deflected as it flows along a surface, providing the curvature, of the cooling fluid conducting element 36 to the stator connection device 26. A curvature of the deflection region 42 can be adapted in particular to a direction of rotation of the rotor 18 of the electric machine 12 relative to the stator 20. In this case, in particular the curvature profile in the circumferential direction along the cooling fluid conducting element 36 can be adjusted depending on the direction of rotation of the rotor 18 relative to the stator 20. In order to be able to divert the cooling fluid 28 particularly precisely to the stator connection device 26, it is provided in the present case that the cooling fluid conducting element 36 extends at least over a circumferential segment of the stator 20, in which the stator connection device 26 is arranged, as can be seen particularly readily in FIG. 4.

Figure 5:
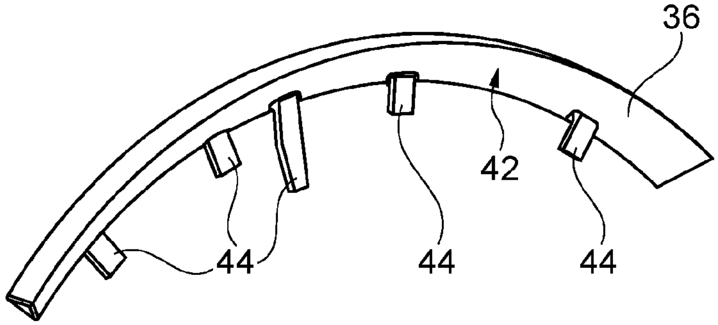
FIG. 5 shows a schematic perspective view of the cooling fluid conducting element which is designed as an annular segment with at least one clamping element which, for holding the cooling fluid conducting element, can be inserted between respective stator windings of the stator and clamped with the stator windings.
Figure 6:
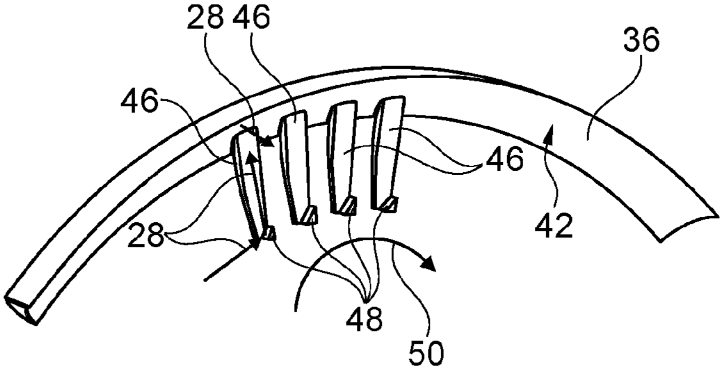
FIG. 6 shows a schematic perspective view of the cooling fluid conducting element in a further configuration in which the cooling fluid conducting element is designed as an annular segment and has a plurality of guide vanes, at the end of which a deflection element is in each case arranged, by means of which cooling fluid flowing over the end face of the stator in the circumferential direction can be trapped and deflected to a deflection region of the cooling fluid conducting element, wherein the deflection region of the cooling fluid conducting element is designed to deflect the trapped cooling fluid to the stator connection device of the stator.

FIGS. 5 and 6 show respective different cooling fluid conducting elements 36, wherein the features of the cooling fluid conducting elements 36 shown in FIGS. 5 and 6 can be freely combined with one another. The cooling fluid conducting element 36 in FIG. 5 has a plurality of clamping elements 44 via which the cooling fluid conducting element 36 can enter into a clamping connection with the stator 20. The clamping elements 44 are designed in particular to be plugged between respective stator windings 24 of the stator 20 and to be clamped between these stator windings 24. This clamping connection makes it possible for the cooling fluid conducting element 36 to be fastened particularly simply to the stator 20 and, furthermore, to be held particularly securely on the stator 20.

The cooling fluid conducting element 36 which is illustrated in FIG. 6 comprises four guide vanes 46 which protrude on the cooling fluid conducting element 36 in the radial direction and therefore toward a central axis of the stator 20. Each of the guide vanes 46 at its free end has a deflection element 48 which is designed to deflect cooling fluid 28 flowing along the end face 34 of the stator 20 in the circumferential direction 50 toward the deflection region 42 of the cooling fluid conducting element 36. The cooling fluid 28 can be deflected in turn toward the stator connection device 26 via the deflection region 42. When the cooling fluid conducting element 36 is configured as a circumferentially closed annular element, a plurality of guide vanes 46 can be arranged distributed at regular intervals over an entire circumference of the annular element.

The cooling fluid conducting element 36 can either have at least one clamping element 44 or at least one guide vane 46 or at least one clamping element 44 and at least one guide vane 46.

The cooling fluid 28 is located in the space of the electric machine 12 where it can be spun by a rotor movement of the rotor 18. The stator 20 which is a stator winding head which can shield connection wires to be cooled of the stator connection device 26 in relation to the cooling fluid flow is located outside the rotor 18. In the near vicinity of the laminate core 22, the cooling fluid 28 can be conveyed radially outward through existing gaps between the stator windings 24, in particular in the protrusion region 40, wherein the cooling fluid flow can be deflected by means of the cooling fluid conducting element 36 onto the connection wires, which are to be cooled, of the stator connection device 26.

Overall, the present disclosure shows how a coolant conducting geometry can be used for cooling local heat sources in an electric drive machine. This coolant conducting geometry is provided in the present case by the cooling fluid conducting element 36.

LIST OF REFERENCE SIGNS

10 Stator arrangement
12 Electric machine
14 Cavity
16 Rotor shaft
18 Rotor
20 Stator
22 Laminated core
24 Stator winding
26 Stator connection device
28 Cooling fluid
30 Radial opening
32 Rotor end face
34 End face of the stator
36 Cooling fluid conducting element
38 Bending-over region
40 Protrusion region
42 Deflection region
44 Clamping element
46 Guide vane
48 Deflection element
50 Circumferential direction

The invention claimed is:

1. A stator arrangement of a stator of an electric machine, the stator arrangement comprising:

a cooling fluid conducting element on the stator, wherein the cooling fluid conducting element is arranged on an end face of the stator, and protrudes at least in certain regions from the end face of the stator in a first axial direction of the stator away from the stator, as a result of which, cooling fluid flowing along the end face of the stator in a radially outward direction away from a central axis of the electric machine is trapped by the cooling fluid conducting element, wherein the cooling fluid is a liquid, wherein the fluid conducting element comprises at least one deflection region which is configured to deflect the trapped cooling fluid toward the first axial direction that is away from the stator and onto a stator connection device of the stator that is located adjacent to the end face of the stator in the first axial direction, as a result of which, the cooling fluid can flow around the stator connection device in order to cool the stator connection device, wherein the stator connection device comprises a plurality of connection wires electrically connected to stator windings.

2. The stator arrangement according to claim 1,
wherein the cooling fluid conducting element is designed as an annular segment or as a circumferentially closed annular segment.

3. The stator arrangement according to claim 1,
wherein the cooling fluid conducting element extends at least over a circumferential segment of the stator.

4. The stator arrangement according to claim 1,
wherein the cooling fluid conducting element lies on a laminated stator core of the stator.

5. The stator arrangement according to claim 4,
wherein the cooling fluid conducting element radially outwardly covers regions of coil wires of stator windings protruding from the laminated stator core.

6. The stator arrangement according to claim 1,
wherein the cooling fluid conducting element has at least one clamping element, which forms a clamping connection to stator windings of the stator to hold the cooling fluid conducting element on the stator.

7. The stator arrangement according to claim 1,
wherein the cooling fluid conducting element comprises:
at least one guide vane, which protrudes radially from the deflection region toward a central axis of the stator; and
a deflection element, which is arranged at its free end and is configured to trap cooling fluid flowing over the end face of the stator in the circumferential direction of the stator and to deflect it toward the deflection region.

8. An electric machine for a motor vehicle, comprising:
a rotor which is held on a rotor shaft for conjoint rotation; and
the stator arrangement according to claim 1.

9. The electric machine according to claim 8,
wherein the rotor shaft comprises:
a cavity through which the cooling fluid flows, and
at least one radial opening via which the cooling fluid can flow radially out of the rotor shaft, as a result of which the cooling fluid which has flowed out of the rotor shaft can flow along a further end face of the rotor to the end face of the stator.

10. The electric machine according to claim 8,
wherein regions of the stator windings which protrude from the laminated stator core radially outwardly surround the further end face of the rotor and are configured to guide the cooling fluid from the further end face of the rotor to the end face of the stator.

* * * * *